(12) United States Patent
Billiet

(10) Patent No.: US 6,461,397 B1
(45) Date of Patent: Oct. 8, 2002

(54) FILTER ASSEMBLY

(75) Inventor: Colin Billiet, Gateshead (GB)

(73) Assignee: Domnick Hunter Limited, Birtley (GB)

( * ) Notice: Subject to any disclaimer, the term of this patent is extended or adjusted under 35 U.S.C. 154(b) by 0 days.

(21) Appl. No.: 09/581,322

(22) PCT Filed: Dec. 14, 1998

(86) PCT No.: PCT/GB98/03671

§ 371 (c)(1),
(2), (4) Date: Aug. 28, 2000

(87) PCT Pub. No.: WO99/30798

PCT Pub. Date: Jun. 24, 1999

(30) Foreign Application Priority Data

Dec. 15, 1997 (GB) .............................. 9726415
Jul. 23, 1998 (GB) .............................. 9815961

(51) Int. Cl.[7] .............................................. B01D 46/00
(52) U.S. Cl. .............................. 55/498; 55/502; 55/503; 55/504
(58) Field of Search .......................... 55/503, 504, 502, 55/498

(56) References Cited

U.S. PATENT DOCUMENTS

| | | |
|---|---|---|
| 3,675,776 A | 7/1972 | Campo |
| 4,063,913 A | 12/1977 | Kippel et al. |
| 4,149,974 A | 4/1979 | Bolton et al. |
| 4,516,994 A | 5/1985 | Kocher |
| 4,544,387 A * | 10/1985 | Agerlid |
| 4,668,256 A | 5/1987 | Billiet et al. |
| 4,764,275 A * | 8/1988 | Robichaud |
| 4,848,989 A | 7/1989 | Maeda |
| 4,904,382 A * | 2/1990 | Thomsen |
| 4,915,831 A * | 4/1990 | Taylor |
| 4,935,134 A * | 6/1990 | Hensgen et al. |
| 4,956,086 A * | 9/1990 | Thomsen et al. |
| 5,114,572 A * | 5/1992 | Hunter et al. |
| 5,395,509 A | 3/1995 | Cisneros et al. |
| 5,925,245 A * | 7/1999 | Bradford et al. |
| 6,299,661 B1 * | 10/2001 | Bloomer |

FOREIGN PATENT DOCUMENTS

| | | |
|---|---|---|
| DE | 37 02 205 A1 | 8/1988 |
| DE | 39 09 402 A1 | 9/1990 |
| EP | 0 197 857 A2 | 10/1986 |
| EP | 0 198 454 A2 | 10/1986 |
| EP | 0 231 862 A2 | 8/1987 |
| EP | 0 278 771 A | 8/1988 |
| EP | 0 547 291 A | 6/1993 |
| EP | 0 578 491 A1 | 1/1994 |
| EP | 0 752 263 A1 | 1/1997 |
| GB | 1 557 946 | 12/1979 |
| GB | 2 126 497 A | 3/1984 |
| GB | 2 250 454 A | 6/1992 |
| GB | 2 261 830 A | 6/1993 |
| GB | 2 295 970 A | 6/1996 |
| GB | 2 307 422 A | 5/1997 |
| WO | WO 88/06228 | 8/1988 |
| WO | WO 90/02597 | 3/1990 |
| WO | WO 94/18387 | 8/1994 |
| WO | WO 96/12547 | 5/1996 |

* cited by examiner

Primary Examiner—Duane S. Smith
(74) Attorney, Agent, or Firm—Workman, Nydegger & Seeley

(57) ABSTRACT

A filter assembly for collecting material that is entrained in a gas stream includes a housing for a tubular elements arranged for the gas stream to flow through its wall, the housing having inlet and outlet ports for the gas that is to be filtered. The assembly includes a flow conduit which has a first conduit opening for communication with one of the ports for the gas that is to be filtered and a second conduit opening for communication with the filter element. The housing and the flow conduit are arranged so that the formation of a seal between the first conduit opening and the said port involves sliding the flow conduit generally transversely relative to the direction of flow of fluid through the port.

30 Claims, 5 Drawing Sheets

FILTER ASSEMBLY

BACKGROUND OF THE INVENTION

1. Field of the Invention

This invention relates to a filter assembly for collecting material that is entrained in a gas stream such as particulate solid material or liquid in an aerosol form, and to a tubular filter element for location in a housing to collect such material.

2. Present State of the Art

Filtration of gas in a compressed gas system is generally required so that the gas is sufficiently clean for a subsequent application or to minimise adverse effects of impurities on components of the system. For example removal of compressor oil can be required to minimise chemical contamination and accumulation on valves which might lead to malfunction of the valves, and removal of particulate solid material can be required to minimise abrasion.

A known filter assembly for use in compressed gas systems is sold by Domnick Hunter Limited under the trade mark OIL-X. It comprises a housing having inlet and outlet ports for the gas stream that is to be filtered and a tubular filter element which can be located in the housing and is configured for the gas stream to flow through its wall, for example generally outwardly from the inside of the filter element to the outside. When the assembly is used to collect liquid in the gas stream (for example which is carried in the stream as aerosol droplets), the filter element will cause the liquid to coalesce. Coalesced liquid then drains from the filter element and collects in the housing for discharge. For such applications, the housing will include an outlet for discharge of any collected liquid.

The housing of such a filter assembly comprises a body section in which the filter element is located and in which a reservoir for any collected liquid can be provided, and a head end cap with the inlet and outlet ports for the gas stream. The end cap includes appropriate conduits within it for the gas stream to flow between the ports and the filter element. The end cap is formed in one piece by a casting process. Seals are formed at the ends of the or each such conduit between (a) the conduit and the filter element and (b) the conduit and a component of the compressed gas system to or from which the gas stream in the filter assembly flows.

The incorporation of a flow conduit into the housing of a filter assembly of this kind places restrictions on the configuration of the flow conduit.

BRIEF SUMMARY OF THE INVENTION

The present invention provides a filter assembly which includes a flow conduit which can be fitted into the housing for controlling flow of gas between a port in the housing and the filter element.

Accordingly, in one aspect, the invention provides a filter assembly for collecting material that is entrained in a gas stream, which comprises a housing for a tubular filter element arranged for the gas stream to flow through its wall, the housing having inlet and outlet ports for the gas that is to be filtered, the assembly further comprising a flow conduit which has a first conduit opening for communication with one of the ports for the gas that is to be filtered and a second conduit opening for communication with the filter element, the housing and the flow conduit being arranged so that the formation of a seal between the first conduit opening and the said port involves sliding the flow conduit generally transversely relative to the direction of flow of fluid through the port.

The assembly of the invention has the advantage that the flow conduit can be made with a configuration that is not restricted by having to be formed as an integral part of the housing. This arises because the flow conduit is defined by a component which is separable from the housing head and which can be formed separately from the head. For example, when the axes of the first and second conduit openings are not aligned, the flow path between the openings can be configured to present a continuous smooth flow path to the gas stream flowing along it between the first and second conduit openings, generally between the port in the housing and the tubular cavity within the filter element. The smooth flow path can be constructed to reduce restriction of the flow of the gas stream compared for example with a flow conduit which presents a discontinuous flow path which is sharply angled or contains steps of other obstructions. Frequently, the angle between the axes of the conduit openings might be at least about 30°, especially at least about 60°, and generally the axis of the first conduit opening will be substantially perpendicular to the axis of the second conduit opening. The flow conduit can be constructed for such applications with a smoothly curved transition between the conduit openings to minimise restrictions to the flow of the gas stream.

Generally, the housing will comprise an end cap and a body section in which the filter element is located when the assembly is in use. One or more ports for gas to be filtered can then be provided in the end cap; the end cap can then accommodate the flow conduit within it when the assembly is in use to provide a flow path for gas to be filtered between one of the ports and the filter element located in the housing body section. A filter assembly which comprises a housing having a body section and an end cap, with a flow conduit received in the end cap, is disclosed in copending U.S. application Ser. No. 09/581,321 entitled Filter Assembly. Subject matter disclosed in that application is incorporated in the specification of the present application by this reference.

The flow conduit can be made with additional features during its manufacture. For example, a port might be formed in it for connection to means for indicating the pressure within the conduit. A tang might be formed on the flow conduit which can be received in a recess in the housing when the flow conduit is properly located within the housing. This can provide an indication that the flow conduit is properly located, for example by visual inspection or as a result of the tang being resiliently deformable and being received in the recess with a snap fit which can be detected visually or by feel by the operator. For example, when located in the recess, the tang might prevent withdrawal of the flow conduit from within the housing.

The present invention therefore enables the operating efficiency of a filter assembly to be improved because of the greater design freedom that is available in the design of the flow conduit compared with a flow conduit that is formed integrally in the housing. Furthermore, the design freedom enables additional features to be incorporated into the design of the flow conduit conveniently. These advantages are significant in terms of design and operation of the assembly of the invention. It has been found that it is entirely feasible to produce the assembly of the invention with satisfactory seals between the flow conduit and the housing and filter element as necessary, so that the assembly of the invention can function without loss of gas from the stream being filtered. Such seals can be in the form of for example compressible gaskets. They might be provided by elastomeric O-rings which can be located in machined grooves in the components.

Generally, the flow of the gas stream towards and away from the assembly will be generally horizontal. The tubular filter element will generally be arranged vertically so that the housing port is at the top of the housing with the filter element located depending below it. When the housing comprises an end cap and a body section, the end cap will be located at the top of the housing when in use, with the body section below it. In such constructions, the axis of the first conduit opening and the axis of the second conduit opening will not be aligned. Generally, the axis of the first conduit opening will be substantially perpendicular to the axis of the second conduit opening.

Assembly of the flow conduit within the housing involved sliding the flow conduit generally transversely relative to the direction of flow of fluid through the port. The flow conduit will generally be slid along an axis that is substantially perpendicular to the axis of the port. It will be understood that the axes need not be strictly perpendicular. Generally the axes will be arranged so that the component of the force imposed on the seal between the flow conduit and the housing, directed along the sliding axis, is small.

The use of a flow conduit which is formed separately from the housing and is fitted into it enables the flow conduit to present a continuous smooth flow path to gas flowing along it between the first and second conduit openings, especially so as to preserve at least partially laminar flow in the gas stream. For example, if the axes of the flow conduit are not aligned, the flow conduit can present a smooth curve to the gas stream. If the cross-section of the flow conduit changes along its length, the change can take place over at least a part of the length of the conduit so as not to present a step discontinuity to the gas stream.

The flow conduit can be located in its appropriate position within the housing, for example within the housing end cap, by means of interengaging ribs on the flow conduit and the housing respectively. For example, one of the flow conduit and the housing can have a flange on it whose opposite edges present a pair of ribs which are received between a corresponding pair of ribs on the other of the flow conduit and the housing, to retain the flow conduit within the housing. In a preferred embodiment, the flange with its ribs is provided on the flow conduit and the corresponding ribs are provided on the housing, especially on the housing end cap. The ribs can be aligned with the axis along which the flow conduit is introduced into the housing so that the two sets of ribs engage one another as the flow conduit is introduced. Preferably, the ribs are configured so that the mating sealing surfaces on the flow conduit and the housing are forced together as the flow conduit is introduced into the housing, to enhance the seal between the surfaces. This can be achieved for example by provision of an appropriate taper on the ribs on one or both of the flow conduit and the housing.

Preferably, the filter element is located largely within a body section of the housing. Generally, the connection to the filter element for the flow of gases is made at about the interface between the body section and the housing head end cap. However, the filter element might protrude beyond the end of the body section or the body section might extend beyond the end of the filter element. The housing head end cap and the body section should be capable of being connected to one another with sufficient security to withstand internal pressures to which the assembly is subjected when in use. The connection might be temporary when separation of the end cap and the flow conduit is required or it might be substantially permanent. Examples of appropriate connections include threaded and bayonet type connections.

Preferably, the assembly includes means for indicating when the end cap and the body section are connected to one another sufficiently securely to withstand the internal pressures. This can have the advantage of also indicating that the flow conduit is appropriately located in the housing (whether or not the housing comprises an end cap and a separable body section), for example when the flow conduit engages the body section (directly or indirectly) and it is through the action of the body section on the flow conduit that the flow conduit is forced into the housing end cap. The indication can be visual, for example involving the appearance of a marking in the housing or the flow conduit. The indication can be sensed in other ways, for example by feeling engagement of a resilient member in a recess. For example, one of the flow conduit and the housing can bear a resiliently deformable tang and the other of the flow conduit and the housing can have a recess formed in it in which the tang is received when the flow conduit is properly located within the housing. In a preferred embodiment, the tang is provided on the flow conduit and the recess is provided in the housing, preferably the housing end cap.

The provision of a flow conduit and the housing (especially a housing end cap) means as separate components that the two components can be made from different materials, enabling the materials for the components to be selected according to the requirements of the components when in use and the techniques that are appropriate for their manufacture. For example, it will often be preferred for the housing to be formed from a metallic material such as a steel or an aluminium alloy, in particular to enable the housing to withstand the internal pressures to which it is exposed when in use. The housing (or at least the end cap component thereof) will then often be made from a casting process. Polymeric materials can be used for components of the housing (for example the end cap or the body section or both), in particular when the assembly is not exposed to high internal pressures when in use or when the volume of the housing is small. It will often be preferred for the flow conduit to be made from a polymeric material such as a polyolefin, a polyamide, or a polyester. The polymeric material can be reinforced for example by fibres. The use of a polymeric material for the flow conduit has the advantage that it can conveniently be formed by a moulding process. The combination of a polymeric material for the flow conduit and a metallic material for the housing can facilitate the formation of a seal between the two because of the possibility of slight deformation of the polymer to conform to the sealing surface of the housing.

A seal can be provided in one or both of the surfaces of the housing and the flow conduit which contact one another. For example, a seal can be provided in a face of the flow conduit around the first conduit opening. The seal can be provided in a groove in that face. It can be provided as a separable component of the flow conduit. It might be formed as an integral part of the flow conduit, for example as a result of being formed by moulding in place. The material for seals in a assembly according to the invention will be selected according to the application for the assembly; the seal will generally be provided by an elastomeric material. The sealing faces of the flow conduit and the housing can be substantially planar. Alternative configurations might be used, for example curved. Generally, when the flow conduit and the housing are engaged in a sealing relationship by sliding one of them relative to the other, the cross-sections of each will be substantially the same and substantially constant along the axis of the relative sliding movement.

Preferably, the housing (especially the head end cap thereof) has at least three ports which are to provide between them the inlet and outlet for the gas that is to be filtered. The provision of at least three ports can enable selection of the relative orientation of the inlet and the outlet by selection of the ports in the housing that are to provide the inlet and the outlet respectively. The plurality of ports can also allow the assembly to function as a manifold for combining or separating gas streams.

The assembly can include an adaptor block having formations in it by which a connection can be made to another component (such as a closure cap for sealing the port against flow of gas, a conduit for the flow of gas to or from the filter assembly, or a connector by which the housing can be connected to a similar port on the housing of another filter assembly), the block and the housing being capable of being sealingly connected to one another with the block located adjacent to one of the ports of the housing to provide for flow of the gas stream between the said other component and the said port.

Generally, the flow conduit will provide a path for the gas stream to flow between the inlet in the housing and the tubular cavity within the filter element for the gas to flow outwardly through the filter medium provided in wall of the element so that the filter element functions in an in-to-out mode. Alternative arrangements are envisaged. For example, the flow conduit can provide a path for the gas stream to flow between the tubular cavity within the filter element and the outlet in the housing after the gas has flowed inwardly through the filter medium, so that the filter element functions in an out-to-in mode.

The flow conduit can be provided with an axially facing trough at the conduit opening which communicates with the filter element, in which the filter element, or at least the filter medium thereof, can be received. Techniques for locating and fixing a filter medium into the trough of an end fitting are known.

The assembly of the invention will include the filter element when in use. The filter element comprises a tubular body of a filter medium and top and bottom end fittings by which the filter medium is supported within the housing. The flow conduit can be provided as part of one of the end fittings of the filter element, especially when the end fitting (including the flow conduit) is formed by a moulding operation, especially to direct a gas to be filtered between a port in the housing and the tubular cavity within the filter element. This has the advantage of avoiding the need to provide a sealed connection between the filter element and the flow conduit; the flow conduit can be replaced with the filter element when the condition of the filter medium is such that replacement is required. The manufacture of the end fitting with the flow conduit from a polymeric material by moulding can mean that the cost of producing the end fitting with the flow conduit need not be significantly more than for an end fitting without the conduit. Especially when the flow conduit is formed as part of the filter element, the seal between it and the port in the housing will generally be such as to allow separation of the end fitting and the housing.

The element is preferably supported at or towards the end that is remote from the port in the housing, especially by means of a support which extends between the filter medium and the side wall of the housing. Preferably, the support for the filter element is provided on one of the end fittings. In particular, it can be preferred for the support and the end fitting to be provided as a single component, possibly as a result of being formed together for example as a single piece moulding, or as a result of being connected to one another for example mechanically, or by bonding (with or without an adhesive material).

Preferably, the support extends from its end fitting towards the side wall of the housing generally transversely relative to the longitudinal axis of the filter element. For example the angle between the support and the said axis can be at least about 45°, preferably at least about 60°, more preferably at least about 75°, and possibly 90° or more for some applications when the support will be approximately perpendicular to the axis. When the angle between the support and the axis is less than 90°, it will generally be preferred for the support to be inclined in a direction away from the port in the housing (which will be in the end cap when the housing comprises an end cap and a body section). This has the advantage of enhancing the ability of the support to withstand force exerted by pressurised gas supplied to the housing. Preferably, the housing has an internal support surface on which the support rests when the filter element is properly located within the housing. The support surface can face axially in the housing, towards the end of the housing from which the filter element is inserted into the housing. Accurate positioning of the support surface can ensure that the seal between the filter element and the housing is formed reliably when the filter element is connected to the housing. It can also ensure that a reliable seal is formed between the element and the housing when the body section and the head end cap of the housing are connected to one another.

Preferably, the support comprises at least three limbs which extend between the filter medium and the side wall of the housing. As a result, the filter element is supported stably within the housing, both along and transverse to its axis. Details of a support on the second end fitting of a filter element are disclosed in copending U.S. application Ser. No. 09/581,309 entitled Filter Assembly. Subject matter disclosed in that application is incorporated in the specification of the present application by this reference.

In another aspect, the invention provides a tubular filter element for location in a housing to collect material that is entrained in a gas stream by passing the gas stream through the wall of the element, which comprises a filter medium and first and second end fittings by which connections are formed between the filter element and a housing in which it is located in use, the first end fitting incorporating a flow conduit which can be fitted into a housing to seal to a port in the housing for flow of a gas to be filtered and by which flow of gas between the filter medium and a port in the housing can be controlled, the flow conduit having formations which enable the seal to be formed between it and the said port by sliding the flow conduit relative to the port generally transversely relative to the direction of flow of gas through the port.

In a further aspect, the invention provides a stand alone flow conduit for use with a tubular filter element, such as the filter element discussed above. The flow conduit can be used with a filter element that is to be located within a housing to collect material that is entrained in a gas stream by passing the gas stream through the wall of the element. It has a sealing face at a first end by which a seal can be formed to a port in the housing, and means for connecting the flow conduit at a second end to a filter medium, so that the flow conduit can control the flow of gas between the port in the housing and the filter medium, the flow conduit having formations which enable a seal to be formed between it and the port in the housing by sliding the flow conduit relative to the port generally transversely relative to the direction of flow of gas through the port.

In a preferred embodiment, the filter element can be removed from the housing with the flow conduit as a one-piece assembly. For example, the flow conduit and the end fitting of the filter element can be incorporated into the element as a single component, for example by being manufactured as a single piece or by manufacture as a number of pieces which are fastened to one another, for example mechanically or by bonding (with or without an adhesive material). The flow conduit and the end fitting might instead be separable.

The filter medium will be selected according to the requirements on the assembly when in use, for example in terms of the nature and quantity of the impurity (for example as to whether it comprises liquid impurity or solid impurity or both) in the gas stream, the degree of filtration required of the medium, the pressure to which the assembly is exposed when in use. When the impurity to be collected includes liquid (which will generally be present as an aerosol for example of compressor oil), the filter medium will preferably be capable of causing liquid droplets to coalesce. Materials suitable for use in a coalescing filter element are known, including those sold by Domnick Hunter Limited under the trade mark OIL-X. Suitable materials include borosilicate and other glass fibres, activated carbon materials, activated silica materials and so on.

When the filter assembly is intended for use in applications in which liquid impurities are to be collected, the housing preferably includes an outlet at its second end for liquid entrained in the gas stream which coalesces in the filter element. The housing can include a separable base end cap which defines a reservoir into which coalesced liquid can drain from the filter element and which has a valved outlet for discharge of collected liquid from the housing. Preferably, the body section and the base end cap are both open at the interface between them so that the base end cap closes the housing at its lower end. A valved outlet for coalesced liquid can be provided in the base end cap. The reservoir can be made from a material that is transparent. The provision of a reservoir in a separable end cap has the advantage of ready access to the interior of the housing at its lower end, for example for inspection of the element or for inspection, cleaning or replacement of the reservoir or any valve located within it. When the housing includes a separable base end cap, a support surface for a support on the filter element can be provided in the base end cap, for example in the form of a shoulder or ledge, provided by an end surface or on an internally projecting rib or a recess.

When the housing comprises a separable base end cap, the body section of the housing can be formed with a substantially constant cross-section along its length. This allows the body section to be formed by extrusion. This has the advantages of convenience and of allowing the length of the body section to be selected easily to fit an appropriate filter element. Details of a housing which with a body section having a constant cross-section and separable end caps are disclosed in copending PCT application, publication no. WO-A-99/30803 entitled Filter Assembly.

Furthermore, the body section can be formed with formations such as ribs or grooves in its wall extending along its length. The formation can be provided with a transverse discontinuity (such as a groove when the formation is a rib) at a longitudinally extending edge thereof, by which the end cap can engage the body section. Details of a housing whose body has a constant cross-section, with a longitudinally extending internal formation and a communicating transverse formation, are disclosed in copending U.S. application Ser. No. 09/581,328 entitled Filter Assembly. Subject matter that is disclosed in that application is incorporated in the specification of the present application by this reference.

When the housing comprises a body section and a base end cap, it can be preferred for the recess in which the support fits to be provided on the base end cap. Preferably, the body section and the end cap are open at the interface between them so that the base end cap closes the housing at its lower end. Preferably, the recess into which the support fits is provided at about the interface between the body section and the base end cap. For example, the recess might be provided in the base end cap at about the interface with the body section.

The flow conduit can have a port formed in it for connection to means for indicating the pressure within the conduit. For example, the pressure indication port might be provided at the end of a bore which communicates with the main flow path for the gas stream within the flow conduit. The pressure indication means can be incorporated into the housing, especially the head end cap. It might comprise for example a pressure gauge possibly with a calibrated display. It might alternatively provide an indication of whether the pressure within the housing is either at about atmospheric pressure or at the working pressure of the assembly.

As discussed above, it is preferred that the assembly incorporates a tang which can be deformed resiliently during formation of a connection to the housing, and which, when the connection is formed, can be received in a recess in the housing which allows the configuration of the tang to be restored at least partially towards its undeformed configuration. The tang can be provided on the flow conduit. A tang can be provided in addition or instead on an end fitting of the filter element when the end fitting and the flow conduit do not form a one-piece assembly. Details of the location of a deformable tang in a recess to retain connected components of a filter assembly together or to indicate proper connection of the components are disclosed in copending U.S. application Ser. No. 09/581,325 entitled Filter Assembly. Subject matter disclosed in that application is incorporated in the specification of the present application by this reference.

BRIEF DESCRIPTION OF THE DRAWINGS

The present invention will now be described, by way of example only, with reference to the accompanying drawings, in which.

DETAILED DESCRIPTION OF THE PREFERRED EMBODIMENTS

Figure 1:
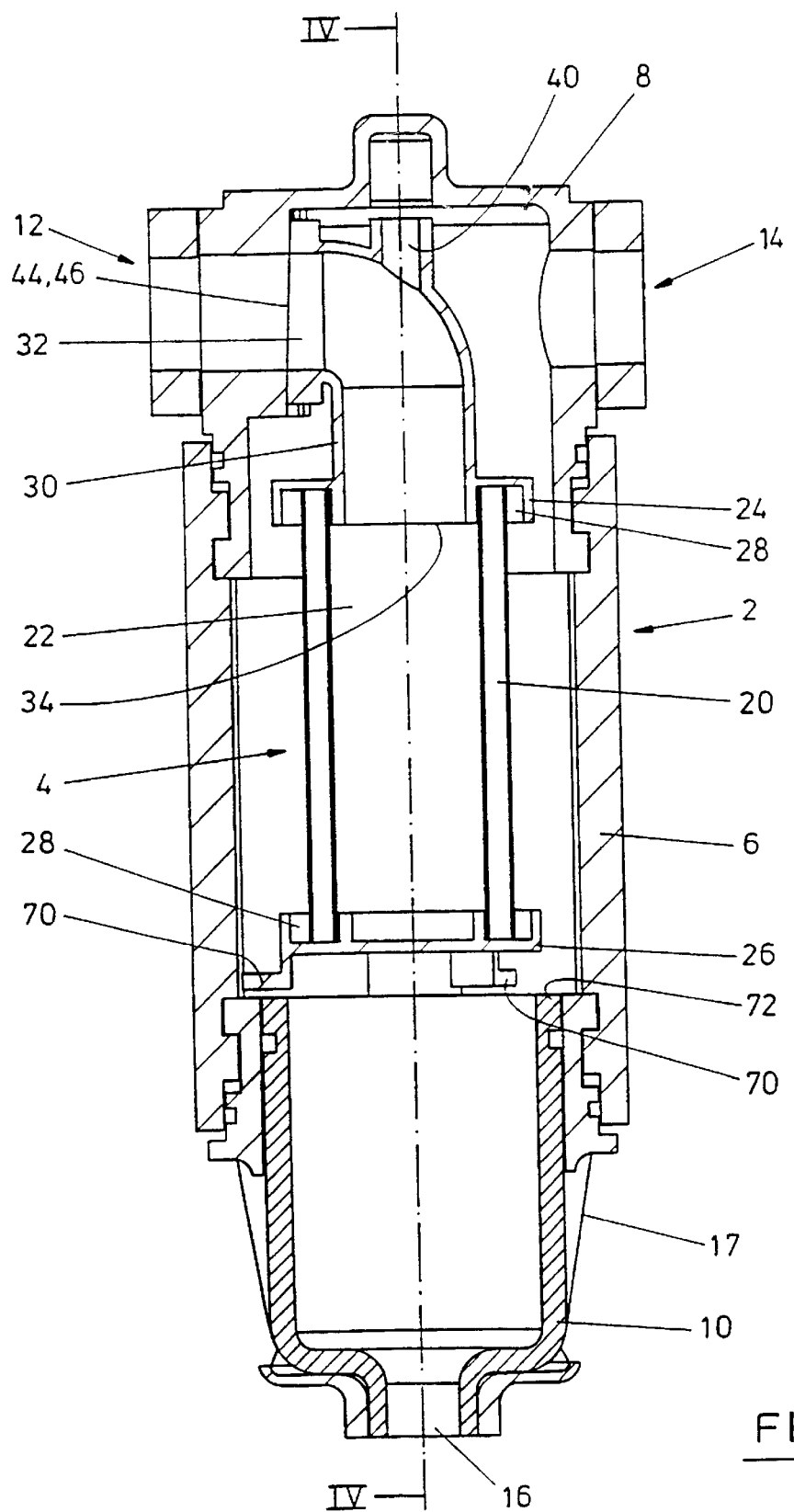
FIG. 1 is a sectional side elevation through a filter assembly according to the invention.
Figure 2:
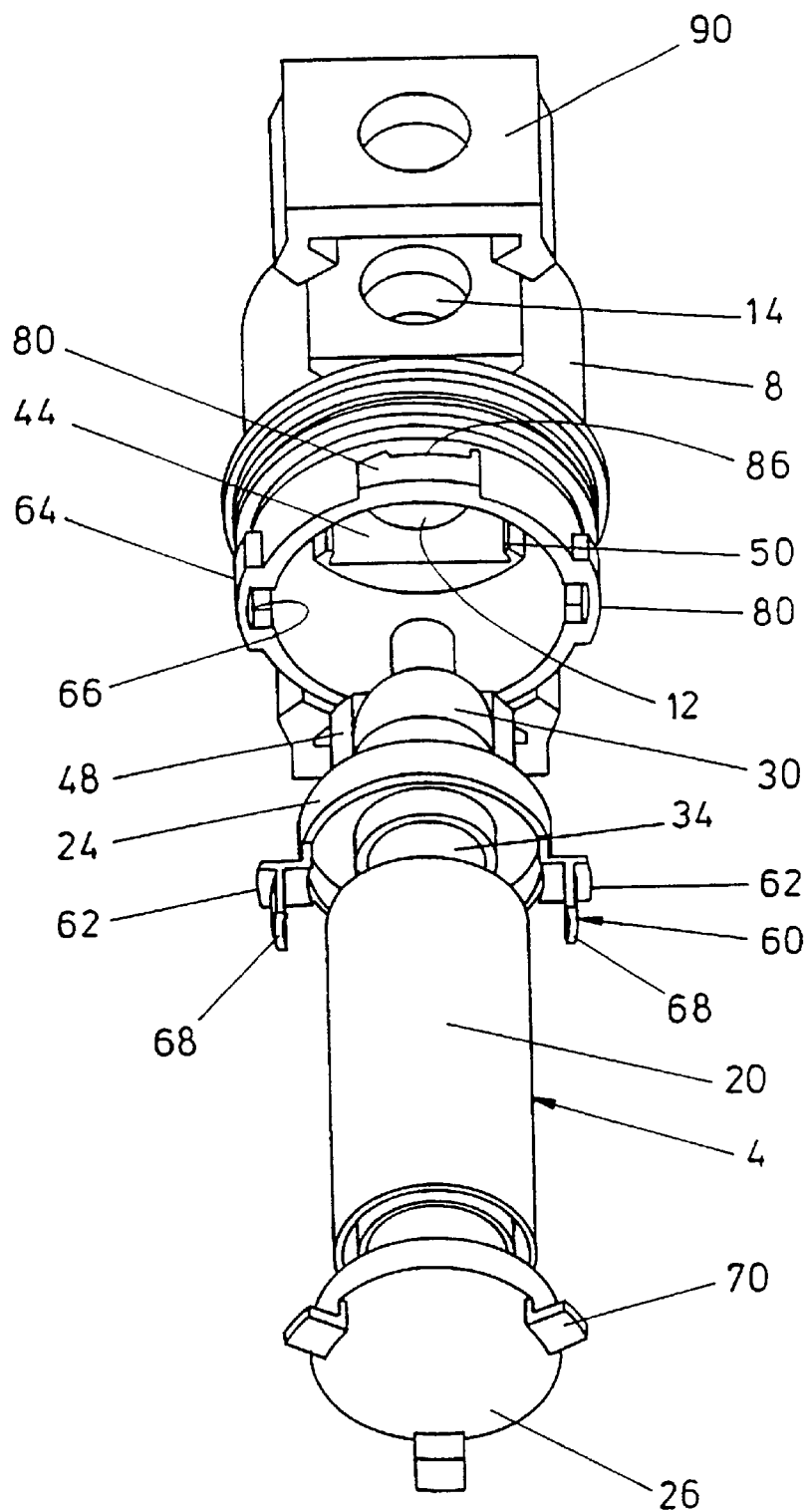
FIG. 2 is an exploded view from below of the filter element and head end cap of the housing of the assembly.

Referring to the drawings, the assembly of the invention comprises a housing 2 and a filter element 4. The housing consists of a body section 6 and head and base end caps 8, 10. The filter element is located wholly within the body section 6 of the housing with the ends of the body section extending beyond the ends of the filter element.

The head end cap 8 contains an inlet port 12 and an outlet port 14 for a gas that is to be filtered. When the assembly is to be used to collect liquid in a gas stream, the base end cap 10 can provide a reservoir, and can contain an outlet 16 for liquid that has collected in the assembly. It can conveniently be made from a transparent material so that the level of liquid within it can be inspected. It can include a protective cage 17 for the reservoir.

The filter element 4 comprises a cylindrical wall section 20 formed from a filter medium and top and bottom end fittings 24, 26. The wall section defines a cavity 22 within it. The material of the filter medium will be selected according to the nature of the gas to be filtered and the material in it that is to be filtered. When the gas to be filtered contains aerosol droplets of liquid contaminant, the filter medium will be selected to cause the liquid to coalesce. The coalesced liquid within the filter medium will drain through the filter medium and from the filter element. Each of the end fittings has a trough 28 formed in it in which the wall section 20 is received and sealed so as to ensure that flow of fluid through the filter element takes place through the filter medium.

In use, a gas that is to be filtered enters the housing 2 through the inlet port 12 in the head end cap 8 and is directed to the internal cavity 22 within the filter medium by means of a flow conduit 30. The gas flows outwardly through the filter medium. Any liquid in the gas stream can be coalesced within the filter medium. Any solid particles within the gas stream can also be collected by the filter element.

Gas that has passed through the filter medium is discharged from the assembly through the outlet port 14 in the head end cap 8.

The description above applies to the filter assembly when operated in an in-to-out mode. As discussed above, the assembly can instead be configured for use in an out-to-in mode. In each case, connections to the housing end cap for the flow of fluid can be made by means of an adaptor block 90 which can be fitted to the housing head end cap 8 and which bears appropriate formations to make a secure connection to a conduit for the fluid to be filtered or other component.

The flow conduit 30, by which the flow of gas between the inlet port 12 in the head end cap and the internal cavity 22 within filter medium 20 is directed, is located within the head end cap 8. The flow conduit 30 has a first conduit opening 32 which is sealed to the inlet port 12, and a second conduit opening 34 which communicates with the internal cavity 22 within the filter medium. In the illustrated embodiment, the angle between the axes of the two openings is about 90°. The flow conduit 30 is gently curved and presents a smooth flow path for a gas stream flowing between the two openings. The flow conduit has a port 40 in it for connection to a gauge for measuring the differential pressure across the filter element. The flow conduit 30 can be formed with its curved shape and integral port and other features by a moulding process, especially when it is formed from polymeric material. The flow conduit can be formed as a one-piece moulding with the top end fitting 24 of the filter element 4.

Figure 3:
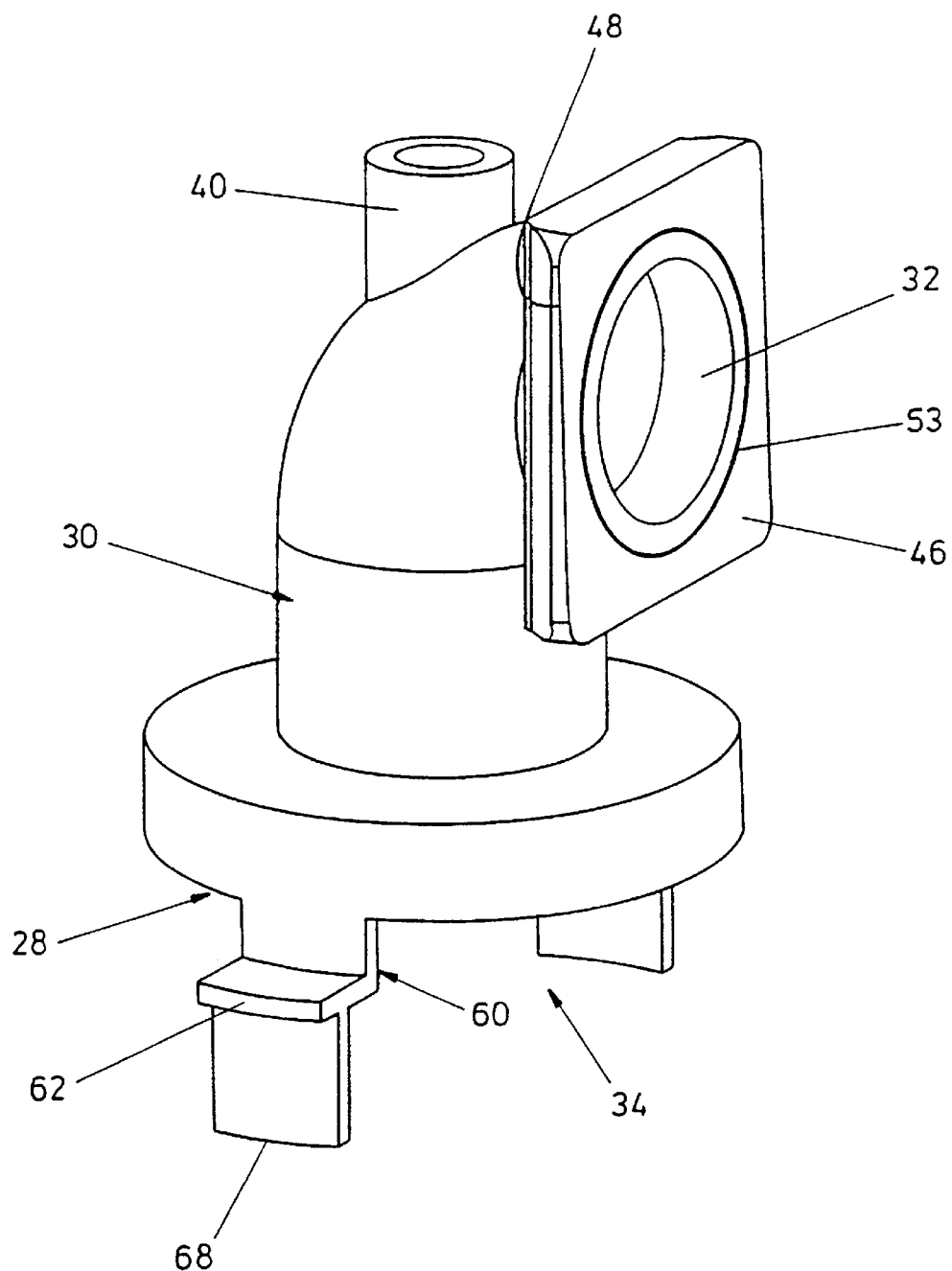
FIG. 3 is an isometric view of the flow conduit of the assembly.

The inlet port 12 in the head end cap and the corresponding face of the flow conduit present mating planar internal surfaces 44, 46. The opposite edges of the surface 46 on the flow conduit present a pair of ribs 48 which are received between a corresponding pair of ribs 50 presented by the surface 44 on the end cap to retain the sealing surfaces in contact with one another. The ribs 48 on the flow conduit and the ribs 50 on the end cap are aligned with the axis along which the flow conduit is introduced into the housing end cap so that the two sets of ribs engage one another as the flow conduit is introduced. The ribs are tapered so that they have a wedge shape when viewed from the side to ensure that the mating sealing surfaces 44, 46 on the flow conduit and the housing head end cap are forced together as the flow conduit is introduced into the end cap, to enhance the seal between the surfaces. The taper on the ribs 48 on the flow conduit can be seen in particular in FIG. 3. A sealing gasket 52 is provided in a groove on the surface 46 of the flow conduit around the first conduit opening 32, which is compressed between that surface and the surface 44 on the end cap. The port 40 for connection to a differential pressure gauge can be received in a downwardly facing socket in the end cap, forming a seal by compression of a gasket between the internal surface of the socket and the external surface of the port.

Figure 4:
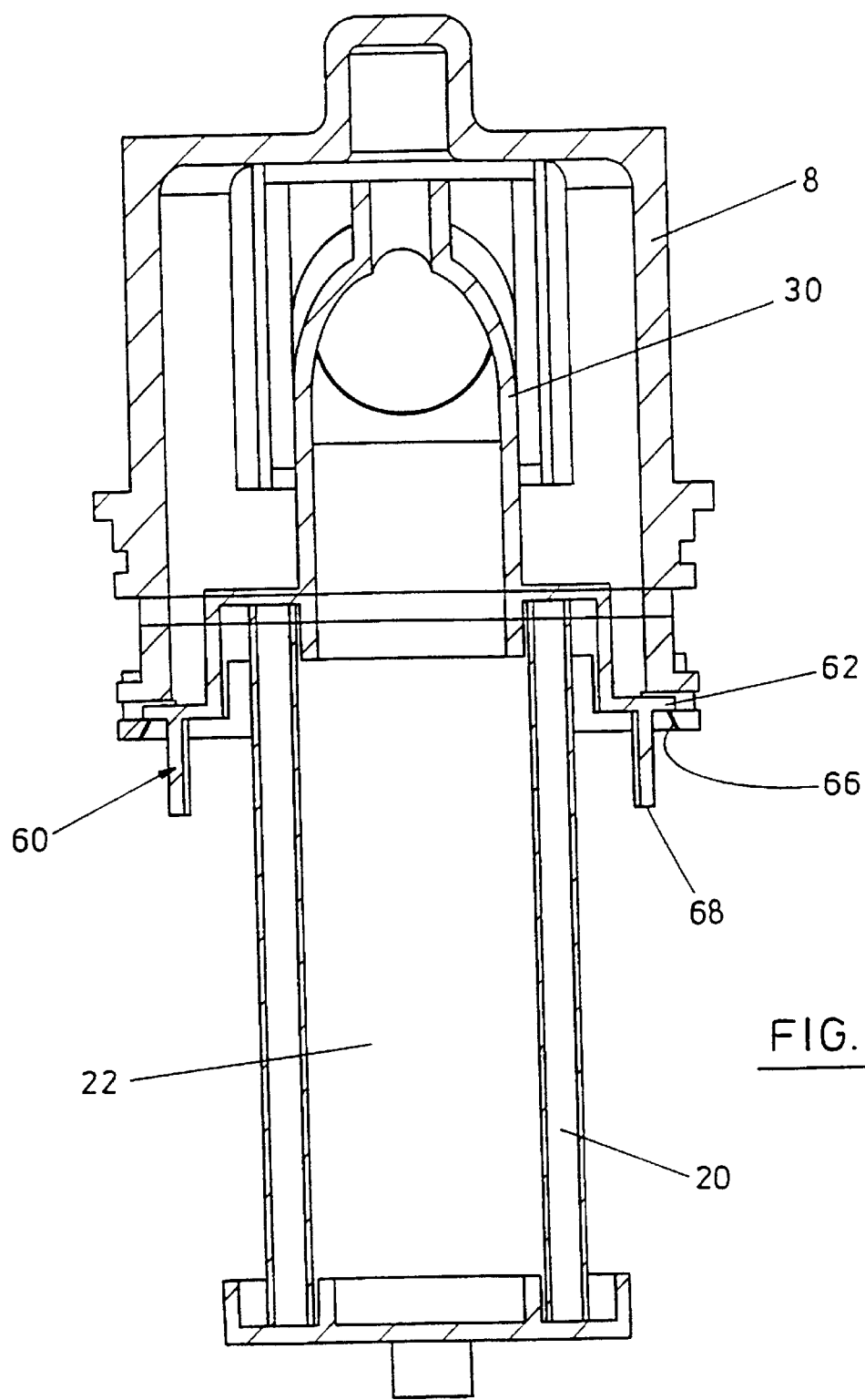
FIG. 4 is a sectional elevation through the head end cap and flow conduit of the assembly on the line IV—IV.

The flow conduit 30 bears two downwardly extending deformable tangs 60. Each tang has an outwardly projecting limb 62 which can be received in a slot 64 in the housing end cap 8 when the flow conduit is properly located in the end cap, as shown in FIG. 4. Location of the limb 62 in the slot 64 is facilitated by a tapered ramp 66 to the slot, causing the tang to be deformed inwardly before springing back into the slot. Location of the tang in the slot can be detected by the operator by feel. As shown in the drawings, the slot can be open so that location of the tang in the slot can be detected by visual inspection. Once located in the slot, the limb can retain the flow conduit within the end cap, at least until other components of the assembly have been introduced. The tang 60 also includes a downwardly extending projection 68 by which the tang can be deformed inwardly to release the limb 62 from the slot, allowing the flow conduit to be released from the end cap.

The bottom end fitting 26 includes three transversely extending limbs 70 which extend between the filter medium 20 and the internal wall of the housing. The limbs engage a support surface in the form of an upwardly facing ledge 72 on the base end cap 10 of the housing. When the assembly is assembled with head and base end caps connected to the body section 6 of the housing and the flow conduit 30 within the head end cap, the support provided for the filter element by the limbs 70 acting on the base end cap retains the flow conduit within the head end cap 8, against the downward force resulting from the differential pressure across the filter medium.

Figure 5:
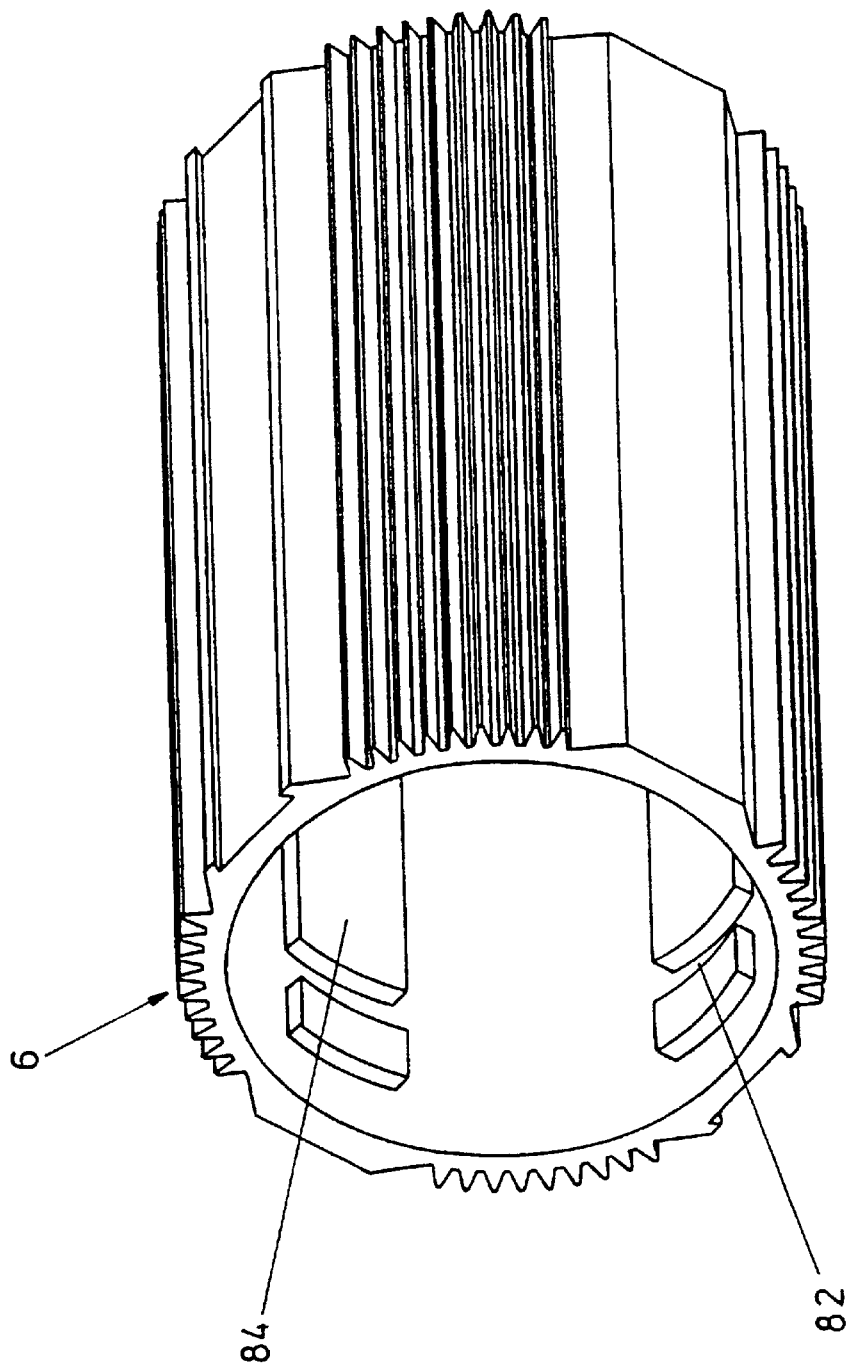
FIG. 5 is an isometric view of the body section of the assembly.

The connections between the head end cap 8 and the body section 6 of the housing can be made by a bayonet arrangement in which four orthogonally arranged lugs 80 on the end cap which are received in transverse grooves within the body section. As can be seen in FIG. 5, each groove 82 is formed in one of four longitudinally extending ribs 84. A detent 86 on at least some of the lugs 80 can retain the lugs and grooves together, preventing inadvertent rotation which would release the end cap from the body section. A similar arrangement of lugs and grooves can be used to form a connection between the base end cap and the body section.

Appropriate seals will be provided between the components of the housing to prevent unwanted loss of pressure.

What is claimed is:

1. A filter assembly for collecting material that is entrained in a gas stream, the filter assembly comprising:
   a housing for a tubular filter element arranged for the gas stream to flow through the wall of the tubular filter element, the housing having inlet and outlet ports for the gas that is to be filtered; and
   a flow conduit which has a first conduit opening in communication with one of the ports for the gas that is to be filtered and a second conduit opening in communication with the tubular filter element, the housing and the flow conduit being arranged so that the formation of a seal between the first conduit opening and the one of the ports involves sliding the flow conduit relative to the housing generally transversely relative to the direction of flow of fluid through the one of the ports.

2. A filter assembly as claimed in claim 1, in which the axis of the first conduit opening and the axis of the second conduit opening are not aligned.

3. A filter assembly as claimed in claim 2, in which the axis of the first conduit opening is substantially perpendicular to the axis of the second conduit opening.

4. A filter assembly as claimed in claim 2, in which the flow conduit presents a continuous smooth flow path to gas flowing along it between the first and second conduit openings.

5. A filter assembly as claimed in claim 1, in which the flow conduit is located in its appropriate position within the housing by interengaging ribs on the flow conduit and the housing respectively.

6. A filter assembly as claimed in claim 5, in which the flow conduit has a flange on it whose opposite edges present a pair of ribs which are received between a corresponding pair of ribs on the housing to retain the flow conduit within the housing.

7. A filter assembly as claimed in claim 5, in which the ribs are arranged so that the ribs on the flow conduit engage the ribs on the housing as the flow conduit is introduced into the housing.

8. A filter assembly as claimed in claim 1, in which one of the flow conduit and the housing bears a resiliently deformable tang and the other of the flow conduit and the housing has a recess formed in it in which the tang is received when the flow conduit is properly located within the housing.

9. A filter assembly as claimed in claim 8, in which the tang is provided on the flow conduit and the recess is provided in the housing.

10. A filter assembly as claimed in claim 1, in which the flow conduit is formed from a polymeric material.

11. A filter assembly as claimed in claim 1, in which the flow conduit is formed by a moulding process.

12. A filter assembly as claimed in claim 1, in which the flow conduit has a trough at the end which is open in the direction facing towards the filter element, in which the end of the tubular filter medium can be received.

13. A filter assembly as claimed in claim 1, which includes a tubular filter element located within the housing.

14. A filter assembly as claimed in claim 13, in which the filter element can be removed from the housing with the flow conduit as a one-piece assembly.

15. A filter assembly as claimed in claim 1, in which the housing includes an outlet at its second end for liquid entrained in the gas stream which coalesces in the filter element.

16. A filter assembly as claimed in claim 1, in which the flow conduit has a port formed in it for connection to means for indicating the pressure within the conduit.

17. A filter assembly as claimed in claim 16, which includes means for indicating the pressure within the flow conduit, that is connected to the said port in the flow conduit.

18. A filter assembly as claimed in claim 1, in which the housing comprises an end cap and a body section in which the filter element is located when the assembly is in use, at least one of the ports for gas to be filtered being provided in the end cap, the end cap accommodating the flow conduit within it when the assembly is in use to provide a flow path for gas to be filtered between one of the ports and the filter element located in the housing body section.

19. A tubular filter element for location in a housing to collect material that is entrained in a gas stream by passing the gas stream through the wall of the element, the tubular filter element comprising:

a filter medium; and a first end fitting by which a connection is formed between the filter element and a housing in which the filter element is located when in use, the first end fitting incorporating a flow conduit which can be fitted into the housing to seal to a port in the housing for flow of a gas to be filtered and by which flow of gas between the filter medium and the port in the housing can be controlled, the flow conduit having a flange with a pair of opposite edges which can engage corresponding ribs on the housing to hold the flow conduit in sealing engagement with the port, the edges of the flange being arranged so that the seal is formed by sliding the flow conduit relative to the port in a direction that is generally transverse to the direction of the flow of the gas stream between the flow conduit and the port.

20. A filter assembly as claimed in claim 19, in which the flow conduit has a first conduit opening for communication with the port in the housing in which the filter element is installed when in use and a second conduit opening for communication with the filter element, and in which the axis of the first conduit opening and the axis of the second conduit opening are not aligned.

21. A filter element as claimed in claim 19, in which the axis of the first conduit opening is substantially perpendicular to the axis of the second conduit opening.

22. A filter element as claimed in claim 19, in which the flow conduit presents a continuous smooth flow path to gas flowing along it between the first and second conduit openings.

23. A filter element as claimed in claim 19, in which the second end fitting includes a support which extends between the filter element and the internal side wall of the housing to restrict the filter element against movement within the housing in a direction along the axis of the filter element.

24. A filter element as claimed in claim 23, in which the support extends from its end fitting in a direction towards the side wall of a housing in which the element is to be used, generally transversely relative to the axis of the filter element.

25. A filter element as claimed in claim 23, in which the support comprises at least three limbs which are arranged to extend between the filter medium and the side wall of a housing in which the filter element is to be used.

26. A filter assembly which comprises a filter element as claimed in claim 19 and a housing, the housing comprising an end cap in which the flow conduit can be fitted and a body section in which the filter element can be fitted.

27. A filter assembly as claimed in claim 19, which includes a seal on the face of the end fitting which is to seal to the port in the end cap of the housing.

28. A filter assembly for filtering a gas stream comprising:

a housing having an inlet port and an outlet port;

a tubular filter element disposed within the housing and having a wall; and a flow conduit having a first end and a second end, the first end of the flow conduit being slid within a portion of the housing so as to effect a sealed communication with a select one of the inlet port and the outlet port, the second end of the flow conduit being disposed in communication with the filter element so that the gas stream to be filtered passes through the wall of the tubular filter element.

29. The filter assembly as claimed in claim 28, wherein formation of the sealed communication between the flow conduit and the select one of the inlet port and the outlet port comprises the flow conduit being slid in a direction generally transverse to the direction of flow of gas stream through the select port.

30. The filter assembly as recited in claim 28, wherein the flow conduit is located in its appropriate position within the housing by interengaging ribs on the flow conduit and on the housing.

* * * * *

UNITED STATES PATENT AND TRADEMARK OFFICE
CERTIFICATE OF CORRECTION

PATENT NO. : 6,461,397 B1
DATED : October 8, 2002
INVENTOR(S) : Colin Billiet

It is certified that error appears in the above-identified patent and that said Letters Patent is hereby corrected as shown below:

<u>Title Page,</u>
Item [57], ABSTRACT,
Line 2, change "elements" to -- element --

<u>Column 4,</u>
Line 56, change "a" to -- an --

<u>Column 5,</u>
Line 22, after "in" insert -- the --

<u>Column 10,</u>
Line 18, change "drawings" to -- drawing --

<u>Column 12,</u>
Line 11, change "assembly" to -- element --

Signed and Sealed this

Eleventh Day of March, 2003

JAMES E. ROGAN
*Director of the United States Patent and Trademark Office*